Oct. 28, 1941.  B. STELZER  2,260,491
HYDRAULIC BRAKING SYSTEM
Filed Nov. 10, 1939   2 Sheets-Sheet 2
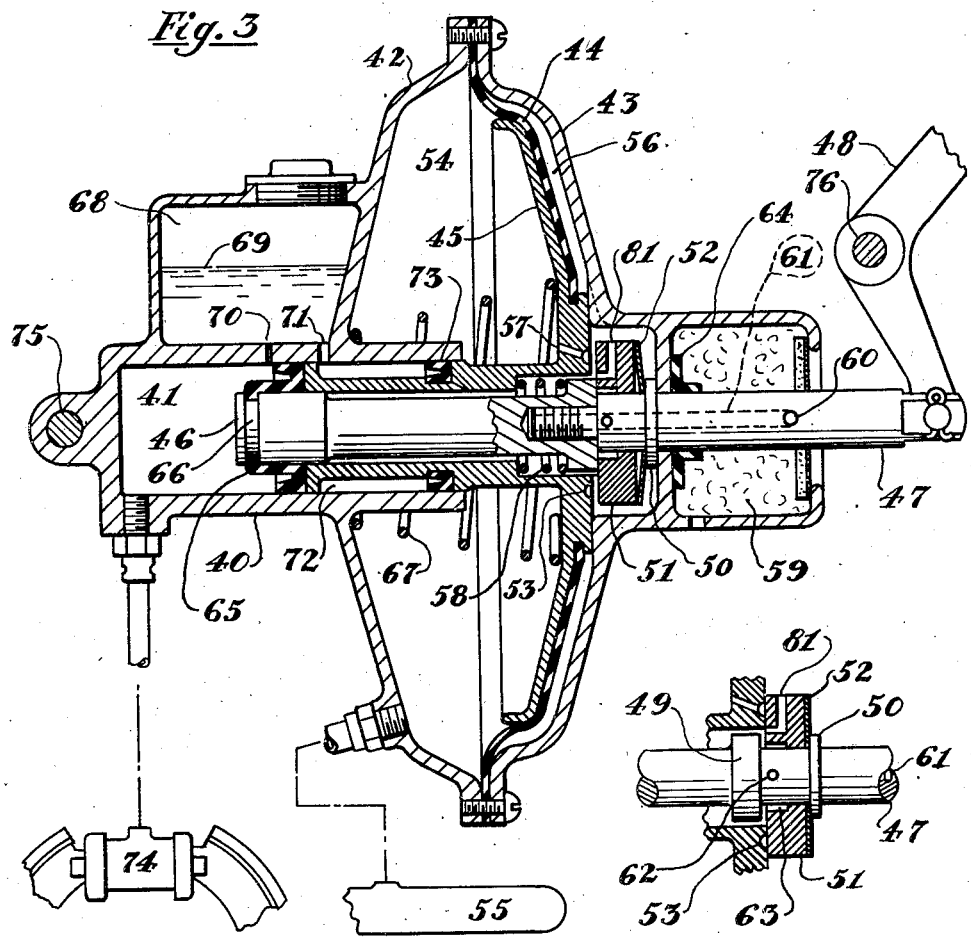
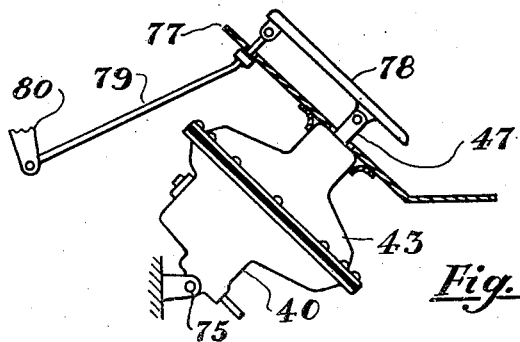
INVENTOR.
Berteli Stelzer Patented Oct. 28, 1941

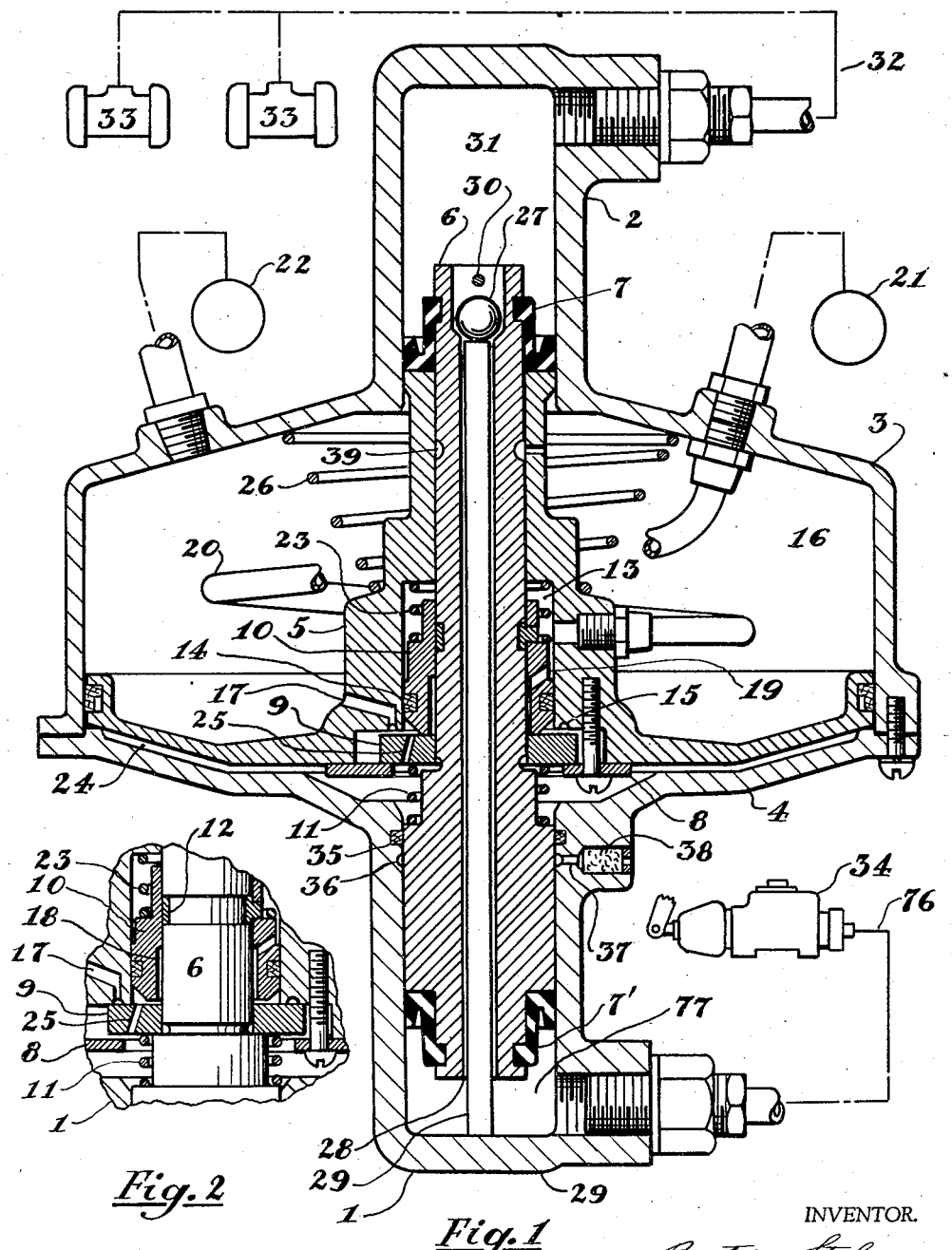

2,260,491

UNITED STATES PATENT OFFICE 2,260,491

HYDRAULIC BRAKING SYSTEM

Berteli Stelzer, Detroit, Mich.

Application November 10, 1939, Serial No. 303,837

4 Claims. (Cl. 188—152)

The invention relates to hydraulic braking systems and more particularly a hydraulic brake booster in which a pressure booster operated by manual power is assisted by a power booster to augment the volume of fluid pumped to the wheel cylinders. The present device is related to a brake booster for which I filed an application for patent June 17, 1939, Serial No. 281,375, in which a hydraulic pressure produced by manual power is stepped up by a source of power.

The object of the present construction is to supply hydraulic fluid under high pressure to the hydraulic brake operating means, i. e., the wheel cylinders, by manual power, and to use a power operated booster to increase the volume of fluid supplied to the wheel cylinders, which results in a simplification of construction and consequent reduction of the cost of manufacturing.

Another object is to provide a follow-up valve which is novel in itself and which provides maximum economy of power, and furthermore limits the excursions to a minimum with an accuracy inherent in the simplicity of construction, to eliminate the necessity of adjustment.

A further object is to provide a construction which is compact and has a minimum of external connections.

Other objects and desirable particular constructions and arrangement of parts will become apparent upon reference to the following detailed description of the two illustrative embodiments shown in the accompanying drawings, in which:

Fig. 1 is a sectional elevation of the hydraulic brake booster with a diagrammatic illustration of the novel system;

Fig. 2, a fragmentary sectional view of the follow-up valve when open to admit power;

Fig. 3, a sectional elevation showing a modification of Fig. 1, where the brake booster is constructed as a master cylinder;

Fig. 4, a fragmentary sectional view of the follow-up valve in Fig. 3 when open to admit power; and Fig. 5, a side elevation illustrating a modified application, in which brake pedal and accelerator pedal are combined.

Referring now to the drawings for a more detailed description of my novel braking system, there is illustrated in Fig. 1 a primary, or low pressure cylinder 1, and a secondary, or high pressure cylinder 2, which forms one piece with pressure cylinder 2, closed by plate 4 extending the power cylinder 3, closed by plate 4 extending from cylinder 1. The cylinders are co-axially arranged and secured together to form one rigid piece. Within said power cylinder 3 moves a power piston or supplementary piston 5 whose one end slides in the secondary cylinder 2. Co-axial with said power piston and extending through it is a double-acting piston 6 consisting of a plunger or piston of small displacement entering into said high-pressure cylinder 2, and a piston of larger displacement sliding in cylinder 1. A piston seal 7 prevents escape from cylinder 2 either between the power piston 5 and cylinder 2 or the small end of piston 6. A similar piston seal 7' seals the large end of piston 6, however, a conventional seal could be used here. A certain axial movement is possible between the double-acting piston 6 and power piston 5, however, it is limited to a necessary minimum by a stop plate 8 secured to the power piston and retaining a follow-up valve consisting of a valve disc 9 sliding on piston 6 and being pressed against a seat 10 by a spring 11. Said seat 10 is securely anchored at 12 (see Fig. 2) to piston 6 and is adapted to slide in the bore 13; a seal 14 is to prevent the passage of air. An annular groove 15 in the power piston communicates with low pressure chamber 16 of the power cylinder by means of a passage 17. Air pressure is conducted to the internal chamber 18 (see Fig. 2) of seat 10 through passage 19 and flexible hose connection 20 from a source of air pressure 21, which may be the atmosphere when chamber 16 is connected to a source of vacuum, or it may be an air pump, and chamber 16 then open to the atmosphere. Thus 21 may designate an air filter allowing air from the atmosphere, and then 22 may designate a source of low pressure, as a vacuum pump or the intake manifold of an internal combustion engine. When as a source of power air above atmospheric pressure is used, as in an air pump, then chamber 16 may be open to the atmosphere and 22 may represent an air filter. The disc 9 of the follow-up valve is so dimensioned, that a small movement thereof is allowed between piston 5 and stop 8, whereby upon movement of said disc 9 against stop 8, urged by spring 23, communication is established between low pressure chamber 16 and chamber 24 of the power cylinder through passage 17, groove 15, and passage 25 in disc 9. A spring 26 serves to return the entire piston assembly to the "off" position, as illustrated in Fig. 1. In order to allow hydraulic fluid to pass from the primary cylinder to the secondary cylinder when the resistance offered by the wheel cylinders is small, I provide a ball check valve 27 allowing fluid to pass from the primary cylinder to the secondary cylinder through passage 28 in which is loosely placed a rod 29 to crack the valve open when the pistons are in the "off" position so that the fluid returned from the wheel cylinders may pass back to the master cylinder. A pin 30 prevents the ball from falling out. Chamber 31 of cylinder 2 communicates through the hydraulic brake line 32 with the wheel cylinders 33, which are indicated diagrammatically. The primary cylinder communicates with the master cylinder 34.

If air pressure above atmospheric is used as a source of power, certain precautions must be taken to prevent air to get into the hydraulic system. For this purpose I provide a seal 35 and a relief groove 36 open to the atmosphere through passage 37 and filter 38. Another relief groove 39 in the piston 6 communicates with chamber 16.

Describing now the modification shown in Figs. 3 and 4, there is shown a housing consisting of a hydraulic cylinder 40 having a chamber 41 and a shell 42 forming part of the diaphragm power cylinder closed by a cover 43 retaining a diaphragm 44 acting on a power piston 45 which slidingly fits into said cylinder 40. The power piston 45 has an axial bore in which slides a plunger or control piston 46 entering into chamber 41 and operated by manual power through extension 47 connected in some suitable manner to the conventional foot pedal 48. Between shoulder 49 of control piston 46 and shoulder 50 of extension 47 slides a valve disc 51 pressed against shoulder 49 by a conical disc spring 52, which while being compressed flat, allows a small movement of disc 51 against shoulder or stop 50. An annular groove 53 communicates with the low pressure chamber 54 connecting with a source of vacuum as for instance the intake manifold 55 of an internal combustion engine. Chamber 56 communicates with chamber 54 through groove 53 and hole 57 when the valve disc is pressed away from the power cylinder as shown in the "off" position in Fig. 3, where the valve disc is opened by spring 58. The source of pressure—which in the embodiment shown by way of example, is the atmosphere, communicating through air cleaner 59, hole 60, passage 61, and hole 62 with chamber 63—is shut off in the "off" position, so that an equal pressure exists on both sides of the diaphragm. Chamber 56 is sealed against atmospheric pressure by means of seal 64. Piston 45 is sealed against piston 46 and cylinder 40 by a seal 65 which sits in groove 66 and slides in cylinder 40. Relative movement between the two pistons, which is very small, causes expansion and contraction of the inner part of cup 65, thus this single seal is doing a double duty, by sealing piston 45 not only against the cylinder wall, but also against piston 46. To return the piston to the "off" position, as shown in Fig. 3, a return spring 67 is provided. 68 designates the hydraulic reservoir for the master cylinder, where 69 is the fluid level, 70 a small hole which permits the hydraulic fluid to return to the reservoir as well as escape of air from the system when the booster is in the "off" position. Another passage 71 communicates with chamber 72 of the power piston which is sealed against the atmosphere by a seal 73. To complete the illustration of the system I indicate a wheel cylinder 74 in communication with chamber 41.

As the power master cylinder or booster is operated mechanically, it must be mounted in some manner to take the reaction. For this purpose cylinder 40 is pivotally secured at 75 to a stationary member of the car, as is pin 76 of the foot pedal 48.

In Fig. 5 the power master cylinder of the construction shown in Fig. 3 is mounted to the toe board 77 of a motor vehicle, and the control piston 47 is operated by a foot pedal 78 which at the same time serves as accelerator pedal, 79 representing the accelerator rod and 80 the throttle lever. In this embodiment the throttle is operated by the toes and the brake with the heel, which eliminates the loss of time caused by moving the foot from the accelerator pedal to the brake pedal when applying the brakes.

Considering now the device shown in Fig. 1 in operation, and assuming that the operator depresses the foot pedal which operates master cylinder 34, a pressure is produced in line 76 and consequently in chamber 77 of the primary cylinder, thus tending to force piston 6 upwardly against the pressure in chamber 31 and springs 23 and 26. As the pressure in chamber 31 is very low until the brake shoes expanded by cylinders 33 touch the brake drums the hydraulic pressure does not build up in chamber 77, but merely passes through passage 28 past the check valve into chamber 31 and from there to the wheel cylinders, thus expanding the brake shoes. This takes place with the booster at rest, the pistons being stationary. However, as the shoes come into contact with the drums, the hydraulic pressure builds up in the entire system; the power piston 5 thereby tends to move out of cylinder 2 but is prevented by some convenient stop on plate 4. Piston 6 now moves upwardly by virtue of the greater force acting on the lower end overpowering the force resisting the movement at the upper end which has a smaller displacement, assuming that the difference is great enough to overpower spring 23, which is contracted until disc 9 contacts the power piston, closing groove 15. At this point communication between chambers 16 and 24 is interrupted, but still no power is applied to the power piston. As piston 6 continues to move upwardly an additional resistance to this movement is introduced by spring 11 which now also must be compressed. Seat 10 moves away from disc 9, as illustrated in Fig. 2, thereby pressure is admitted from the source of pressure 21 through passage 25 into chamber 24 until piston 5 moves upwardly in unison with piston 6, whereby seat 10 comes into contact with disc 9 again when enough power has been applied. Supposing the power is too great and piston 5 moves faster than piston 6, the valve disc is pushed away again from the annular groove 15 and the pressure is relieved in chamber 24. It is to be mentioned that after piston 6 has moved upwardly a short distance check valve 27 closes, shutting off passage 28. While the master cylinder 34 is applied the pressure in chamber 31 is greater than it is in chamber 77, in the same proportion as the displacement of the primary end of piston 6 is larger than that of the upper end which enters the secondary cylinder. This is not exactly so considering the friction and that the pressure in the primary cylinder must be somewhat increased to compress the springs. At higher pressures, however, the difference due to the springs is negligible. Since the boosted pressure in chamber 31 depends on the ratio between the piston areas of the control piston 6, i. e., between the primary and secondary ends, the proportion given to piston 6 determines the boosted pressure. Piston 6 really may be considered as a booster, it is a pressure increasing device operated by manual power. The power piston 5 has nothing to do with the increase in pressure, it merely increases the volume of the fluid pumped to the wheel cylinders, the volume of fluid pumped by the smaller end of piston 6 alone would not be sufficient to operate the wheel cylinders. For this reason the power piston 5 is used to augment the volume of fluid pumped from cylinder 2. The pressure produced by the smaller end of piston 6 is maintained by the action of the valve mechanism directing the power to the booster, which causes the power piston to move with the control piston without increasing the hydraulic pressure in chamber 31. Supposing that the source of power is not able to move piston 5 at the rate piston 6 is moved, it is picked up by the latter through valve disc 9, the valve seat in piston 5 serving as a stop, whereby the booster ratio is naturally decreased. When the operator releases the pressure on the foot pedal so that it may return, the pressure in chamber 77 is relieved, whereby the pressure in chamber 31 acting on the small end of the control piston 6 pushes the latter downwardly towards the "off" position. This results in immediate closing of the pressure line and opening of the passage between chambers 16 and 24, so that the entire piston assembly, i. e., manually operated piston 6, and power operated piston 5, move downwardly into the "off" position, helped by spring 26. When the "off" position is reached again, valve 27 is cracked open by rod 29, so that the fluid from the wheel cylinders is permitted to return via passage 28 to the master cylinder.

The operation of the modified construction shown in Fig. 3 is similar in principle to that already described in Fig. 1. The difference is mainly in the method of applying the control piston. Whereas in Fig. 1 it is done hydraulically, in Fig. 3 it is performed mechanically. Furthermore the power piston in Fig. 3 has to follow the control piston regardless of the resistance offered by the pressure in cylinder 41.

Depression of foot pedal 48 causes piston 46 to enter into cylinder 41, and disc 51 to cover up groove 53 so that there is no communication between chambers 56 and 54. The power piston 45 is pushed along by valve disc 51 and spring washer 52 with the control piston 46 by manual power. The seal 65 passes orifice 70, and after the brake shoes come into contact a pressure builds up in chamber 41. As soon as said pressure is great enough to overcome spring 58, and assuming that the brake pedal is further depressed by the operator, spring 58 is further compressed, and spring 52 is pressed flat, so that it serves as a stop for the valve movement. In this position communication is established between chambers 59 and 56 through passage 81, so that atmospheric pressure is admitted to the latter to act on power piston. Thus the power piston and the control piston move in unison. When the control piston is slowed down, or the power admitted is somewhat greater than necessary, the control piston 46 will come into contact with the valve disc 51, so that the supply of power is shut off, and yet the pressure in chamber 56 is maintained. This might be called the "holding" position. When the operator takes his foot off the brake pedal, whereby the pressure in chamber 41 returns the control piston towards the "off" position, the valve disc is lifted away from the groove 53 so that the pressures in chambers 54 and 56 are immediately equalized and the power piston is also returned towards the "off" position by spring 67.

I wish it to be understood that by the term "manual power" used in the description I mean the control force used by the operator either directly or indirectly. The most common means at the present is the foot pedal, but a hand lever might be used, or other more complicated control means, which however boil down to direct application of manual force, application of manual force through some intermediate means, and a control force indirectly released by the operator.

For the hydraulic brake operating means I have illustrated the wheel cylinders 33, but I do not wish to be limited to these alone, as other means for applying brakes by fluid under pressure are also known or used at present.

While three illustrative embodiments have been described in detail, it is not my intention to limit the scope of the invention to those particular embodiments or otherwise than by the terms of the appended claims.

I claim:

1. In a hydraulic braking system for a vehicle having hydraulic brake operating means, a hydraulic master cylinder operated by manual power, a cylinder, a small piston therein to supply a small volume of fluid under pressure to said brake operating means, means to operate said small piston by hydraulic manual power from said master cylinder, a power piston in said cylinder to supply an additional volume of fluid under pressure to said brake operating means, fluid transmitting means from said cylinder to said brake operating means and to said master cylinder, a source of power to operate said power piston, a follow-up valve responsive to the movement of said pistons to admit power to the power piston to allow it to move in unison with the small one.

2. In a hydraulic braking system for a vehicle having hydraulic brake operating means, a master cylinder, a pressure increasing device where a piston of a large displacement operates a piston of smaller displacement, said piston of a large displacement being adapted to move in a cylinder which is in communication with said master cylinder, a secondary cylinder into which said piston of smaller displacement is adapted to move to produce a higher pressure, a power piston adapted to move into said secondary cylinder, power means to force said power piston into said secondary cylinder, valve means responsive to the movement of the pistons actuated by the fluid from the master cylinder to apply said power means to move said power piston concurrently with the movement of said pistons actuated by the fluid from the master cylinder, a check valve to allow fluid to flow from said master cylinder to said hydraulic brake operating means, and means to open said valve when said pressure increasing device is in the "off" position, to allow the fluid to return to the master cylinder.

3. In a hydraulic braking system for a vehicle having hydraulic brake operating means, a master cylinder, a brake booster consisting of a primary cylinder in communication with said master cylinder, a secondary cylinder in communication with said hydraulic brake operating means, a double-acting piston whose one end is adapted to slide in said primary cylinder and whose other and smaller end is arranged to enter into said secondary cylinder to produce a higher pressure than exists in the primary cylinder, a power piston surrounding the smaller end of said double-acting piston and providing a sliding seal, said power piston being adapted to slide in said secondary cylinder, a source of power, valve means responsive to the relative position of said double-acting piston and said power piston to apply said source of power to said power piston so that the latter moves in unison with said double-acting piston, to boost the volume of fluid transmitted to said hydraulic brake operating means, and means to permit passage of fluid between said hydraulic brake operating means and said master cylinder when the booster is in the "off" position.

4. In a hydraulic braking system having hydraulic brake operating means, a manually operated master cylinder, a hydraulic booster cylinder, a power piston adapted to enter into said booster cylinder, a small plunger co-axial with said power piston and adapted to slide in the latter to increase the pressure in said booster cylinder, said plunger being operated by the hydraulic pressure from the master cylinder, air pressure to act on said power piston, means to limit the relative axial movement of the pistons to a necessary minimum, a valve responsive to the axial relative movement of said plunger and said power piston to control the air pressure to act on said power piston, whereby the movement of said power piston is subordinate to the movement of said plunger, yielding means urging said plunger and power piston in a releasing, i. e. "off" position, and yielding means urging said valve to pause in a closed position.

BERTELI STELZER